United States Patent [19]

Picard et al.

[11] 4,283,096

[45] Aug. 11, 1981

[54] INTERSHAFT BEARING

[75] Inventors: Harrison R. Picard, Granby; Claude P. Rotondo, Middletown; Harold K. Shaffer, Tolland; Bertrand H. Brown, Glastonbury, all of Conn.

[73] Assignee: United Technologies Corporation, Hartford, Conn.

[21] Appl. No.: 92,899

[22] Filed: Nov. 9, 1979

Related U.S. Application Data

[63] Continuation of Ser. No. 898,607, Apr. 21, 1978, abandoned.

[51] Int. Cl.$^3$ .............................................. F16C 19/52
[52] U.S. Cl. .................................. 308/207 R; 308/216
[58] Field of Search ................... 308/207 R, DIG. 14, 308/DIG. 15, 216, 236, 26, 184 R; 415/136

[56] References Cited

U.S. PATENT DOCUMENTS

| 3,266,006 | 8/1966 | Abbott | 308/DIG. 14 |
| 3,756,672 | 9/1973 | Hibner et al. | 308/26 |

Primary Examiner—Lenard A. Footland
Attorney, Agent, or Firm—Norman Friedland

[57] ABSTRACT

A ring fabricated from metal whose modulus of elasticity is higher than and its coefficient of expansion is lower than the outer race of a roller bearing that supports concentrically mounted shafts of a turbine power plant serves to restrain growth owing to the different thermal and centrifugal forces imposed by each of said shafts otherwise causing the roller of the bearing to loosen.

3 Claims, 1 Drawing Figure

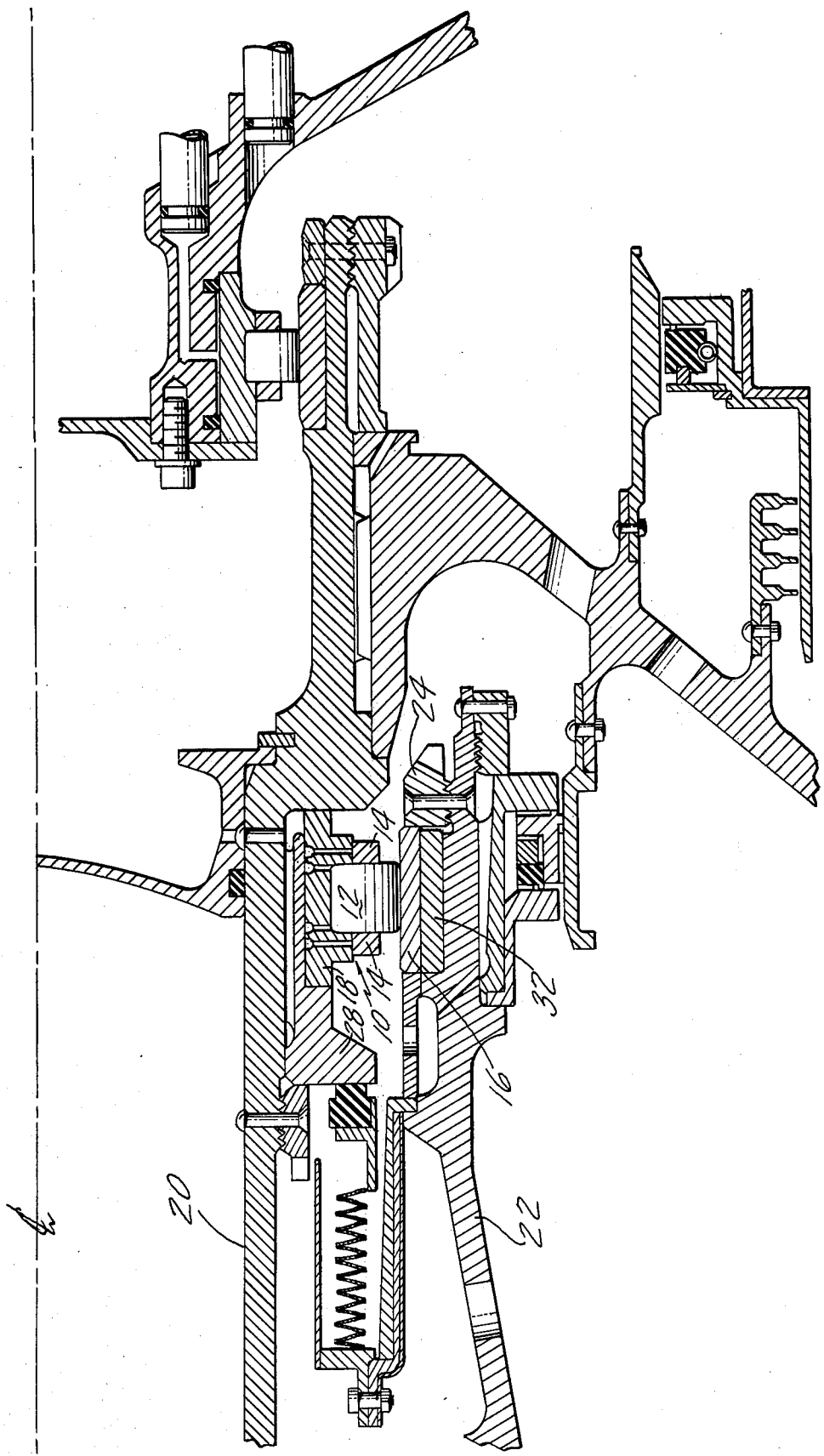

INTERSHAFT BEARING

This is a continuation of application Ser. No. 898,607, now abandoned, filed on Apr. 21, 1978.

BACKGROUND OF THE INVENTION

This invention relates to concentric shafts for the high and low turbine/compressor of a twin spool turbine power plant and particularly to the intershaft bearing thereof.

The problem solved by this invention is the prevention of the rollers of a roller bearing assembly from loosening occasioned by the fact that the high compressor spool runs faster than the low compressor spool of a gas turbine engine so that obviously the difference in rotational speed causes a difference in the centrifugal loads acting on the inner and outer races such that one grows faster than the other hence causing the rollers to loosen.

We have found that we can improve this type of bearing by incorporating a ring fitted adjacent the outer race which ring is selected from material that exhibits a higher modulus of elasticity and lower coefficient of expansion that that exhibited from the material of the bearing. Satisfactory material for such a ring would be fabricated from a molybdenum or tungsten material or alloy thereof. For example an efficacious arrangement would be when the outer race has a coefficient of expansion of $6 \times 10^{-6}$ and its modulus would be $30 \times 10^6$ and the surrounding ring has a coefficient of expansion of $2 \times 10^{-6}$ and its modulus of elasticity is $50 \times 10^6$.

SUMMARY OF THE INVENTION

A feature of this invention is to restrain growth of the outer race of a roller bearing supporting the shafts of a twin spool turbine engine by a tight fitting ring fabricated from a refractory metal exhibiting both higher modulus of elasticity and lower coefficient of expansion than that exhibited by the outer race which it constrains.

Other features and advantages will be apparent from the specification and claims and from the accompanying drawings which illustrate an embodiment of the invention.

BRIEF DESCRIPTION OF THE DRAWING

The sole FIGURE is a fragmentized sectional view showing the improved bearing mounted between coaxial shafts of a twin spool gas turbine engine.

DESCRIPTION OF THE PREFERRED EMBODIMENT

As can be seen in the sole FIGURE, the roller bearing generally illustrated by reference numeral 10 comprises a plurality of rollers 12 (one being shown) suitably retained in space relationship as is conventional by cage 14 mounted between the outer ring 16 defining the outer race and inner ring 18 defining the inner race.

The bearing is suitably locked in position between the low shaft 20 and high shaft 22 by conventional preload and locking members. In the context of this description the low shaft has mounted thereon the low turbine and low compressor and the high shaft has mounted thereon the high turbine and high compressor (not shown) wherein high and low are relative terms referring to the pressure levels to which these parts are exposed. Hence, the locking nut 24 secures the outer ring 16 in position and locking nut secures the inner ring 18 via the intermediate ring 28 in place. Suitable lubrication passages are provided and as is conventional serve to lubricate and cool the bearing.

In the particular environment the low shaft rotates at a slower speed than the high shaft and is exposed to a cooler environment. The consequence of which, owing to this difference in thermal expansion and centrifugal loads tends to change the dimension of the outer race at a faster rate than the inner race causing a looseness in the bearing.

The ring 32 which is shrunk fitted into the inner diameter of shaft 22 surrounds and bears against the outer ring 16. By selecting a material that is characterized by being higher in modulus of elasticity and lower in its coefficient of expansion than outer ring 16, ring 32 prevents bearing growth to an extent that would permit the looseness of the roller caused by the conditions described above. In actual tests a ring made from molybdenum exhibiting a coefficient of expansion of $2 \times 10^{-6}$ inch per inch per degrees Fahrenheit (in./in/°F.) and a modulus of elasticity of $50 \times 10^6$ pounds per square inch (PSI) surrounding an outer ring exhibiting a coefficient of expansion of $6 \times 10^{-6}$ in/in/°F. and a modulus of elasticity of $30 \times 10^6$ PSI proved to be efficacious. Obvious other refractory metals having similar characteristics, as for example tungsten could likewise be utilized.

It should be understood that the invention is not limited to the particular embodiments shown and described herein, but that various changes and modifications may be made without departing from the spirit or scope of this novel concept as defined by the following claims.

We claim:

1. In combination bearing means mounted between an inner shaft and an outer shaft in coaxial alignment and said inner and said outer shafts rotating at different speeds, a plurality of circumferentially spaced rollers, an inner race between said inner shaft and said rollers and rotating with said inner shaft and an outer race between said outer shaft and said rollers and rotating with said outer shaft, said outer shaft rotating at a higher speed than said inner shaft, and a ring element for restricting radial growth thereof surrounding said outer race and in intimate contact with said outer shaft and said outer race and being contiguous therewith, said ring element fabricated from metal characterized by having a low thermal coefficient of expansion and a high elastic modulus relative to the material of said bearing means.

2. The combination of claim 1 wherein said ring element is selected from a metal taken from the group consisting of molybdenum and tungsten.

3. The combination of claim 1 wherein in said ring element modulus of elasticity is substantially equal to $50 \times 10^6$ PSI and coefficient of expansion is substantially equal to $2 \times 10^{-6}$ in/in/°F.

* * * * *